US007539762B2

(12) United States Patent
Achtermann et al.

(10) Patent No.: US 7,539,762 B2
(45) Date of Patent: May 26, 2009

(54) METHOD, SYSTEM AND PROGRAM PRODUCT FOR DETERMINING AN INITIAL NUMBER OF CONNECTIONS FOR A MULTI-SOURCE FILE DOWNLOAD

(75) Inventors: Jeffrey M. Achtermann, Austin, TX (US); Todd J. Gerlach, Austin, TX (US); Nikhil Gupta, Cedar Park, TX (US); Liliana Orozco, Del Valle, TX (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 11/464,661

(22) Filed: Aug. 15, 2006

(65) Prior Publication Data

US 2008/0043774 A1 Feb. 21, 2008

(51) Int. Cl.
*G06F 15/16* (2006.01)
(52) U.S. Cl. ............... 709/228; 709/227; 709/229; 709/218
(58) Field of Classification Search ........... 709/204, 709/224, 220, 217, 218, 219, 227, 228, 229, 709/231, 232; 382/276; 370/390
See application file for complete search history.

(56) References Cited

U.S. PATENT DOCUMENTS

| | | | |
|---|---|---|---|
| 5,809,254 A | 9/1998 | Matsuzono | |
| 6,697,365 B1 * | 2/2004 | Messenger | 370/390 |
| 6,772,217 B1 | 8/2004 | Baumann et al. | |
| 2002/0083193 A1 | 6/2002 | Terefenko | |
| 2002/0165920 A1 * | 11/2002 | Keller-Tuberg | 709/204 |
| 2003/0177183 A1 * | 9/2003 | Cabrera et al. | 709/204 |
| 2003/0231661 A1 | 12/2003 | DePietro et al. | |
| 2006/0031537 A1 | 2/2006 | Boutboul et al. | |
| 2006/0159367 A1 * | 7/2006 | Zeineh et al. | 382/276 |
| 2006/0190598 A1 * | 8/2006 | Cabrera et al. | 709/224 |
| 2007/0288604 A1 * | 12/2007 | Achtermann et al. | 709/220 |

OTHER PUBLICATIONS

Biersack et al: "*Performance Analysis of Peer-to-Peer Networks for File Distribution*"; Fifth International Workshop on QoFIS 2004 (Lecture Notes in Comput. Sci. vol. 3266); pp. 1-10; Published: Berlin, Germany, 2004.
Karrer et al.: "*TCP-Paris: a Parallel Download Protocol for Replicas*"; 10th International Workshop on Web Content Caching and distribution; pp. 15-25; Published: Los Alamitos, CA, USA 2005.
Vazhkudai, S.: "*Enabling the Co-Allocation of Grid Data Transfers*"; Proceedings of the 4th International Workshop on Grid computing (GRID'03); 2003 IEEE; pp. 1-8.

* cited by examiner

*Primary Examiner*—Le Luu
(74) *Attorney, Agent, or Firm*—Dillon & Yudell LLP

(57) ABSTRACT

A method of determining a number of connections to initially utilize for a download of a target data file from a set of one or more servers includes determining a maximum number of initial connections based at least in part upon a number of servers available to serve a target data file to be downloaded, determining a size of the target data file, and determining the number of initial connections to utilize for a download of the target data file. The later determination is based at least in part upon the maximum number of initial connections, the size of the target data file, and a chunk size of one or more chunks into which the target data file is to be decomposed.

15 Claims, 2 Drawing Sheets

METHOD, SYSTEM AND PROGRAM PRODUCT FOR DETERMINING AN INITIAL NUMBER OF CONNECTIONS FOR A MULTI-SOURCE FILE DOWNLOAD

CROSS-REFERENCE TO RELATED APPLICATIONS

The present application is related to the following co-pending U.S. Patent Applications: U.S. patent application Ser. No. 11/256,261 filed on Oct. 21, 2005; U.S. patent application Ser. No. 11/256,260 filed on Oct. 21, 2005; and U.S. patent application Ser. No. 11/256,259 filed on Oct. 21, 2005. The above-mentioned patent applications are assigned to the assignee of the present invention and are incorporated herein by reference in their entirety.

BACKGROUND OF THE INVENTION

1. Technical Field

The present invention relates in general to the field of data processing and in particular to data processing within a computer network. Still more particularly, the present invention relates to an improved method, system and program product for determining a number of connections to utilize to download a target data file.

2. Description of the Related Art

Computer systems utilize transfer protocols to download data files from server computers to client computers via computer networks, such as the Internet. Common transfer protocols include File Transfer Protocol (FTP) and Hypertext Transfer Protocol (HTTP). Conventional computer systems are capable of partitioning the download of a single file into different segments (also referred to as chunks), each of which may be received contemporaneously via connections with multiple servers that contain the file. Computer systems capable of multi-source downloads typically utilize a network to connect to one server and begin downloading the desired file, then subsequently locate another server hosting the same file and begin downloading a different portion of the file. Since the rate at which servers upload files is finite and download rates are generally faster than upload rates, multi-source downloads are faster and more efficient than single-source downloads.

In order to successfully complete a multi-source file download, a computer system must first determine the ideal number of chunks into which to decompose the data file. The initial number of chunks is typically equal to the initial number of server connections formed. Conventional multi-source download methods typically involve either initially allocating the whole file to a single network connection and then breaking up the file by starting new connections as time passes or decomposing the file upfront into a predetermined number of chunks regardless of connection time and speed. Although one or the other of these conventional approaches may ultimately be more efficient for a given download scenario, both approaches are subject to inefficiency. For example, initiating new connections during the file transfer based upon dynamic connection attributes entails ongoing processing overhead to manage the file transfer. On the other hand, utilizing a predetermined number of chunks regardless of dynamic connection attributes may lead to the use of too many or too few connections, similarly leading to inefficient use of available connection resources or an unnecessarily long file transfer. The present invention thus recognizes that an improved method, system and program product for determining a number of connections/chunks for a multi-source file download is needed.

SUMMARY OF THE INVENTION

The present invention provides a method, system and program product for determining a number of connections to utilize to download a target data file.

According to one embodiment, a method of determining a number of connections to initially utilize for a download of a target data file from a set of one or more servers includes determining a maximum number of initial connections based at least in part upon a number of servers available to serve a target data file to be downloaded, determining a size of the target data file, and determining the number of initial connections to utilize for a download of the target data file. The later determination is based at least in part upon the maximum number of initial connections, the size of the target data file, and a chunk size of one or more chunks into which the target data file is to be decomposed.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and program product for determining an initial number of chunks into which a computer file is decomposed prior to a multi-source download.

Figure 1:
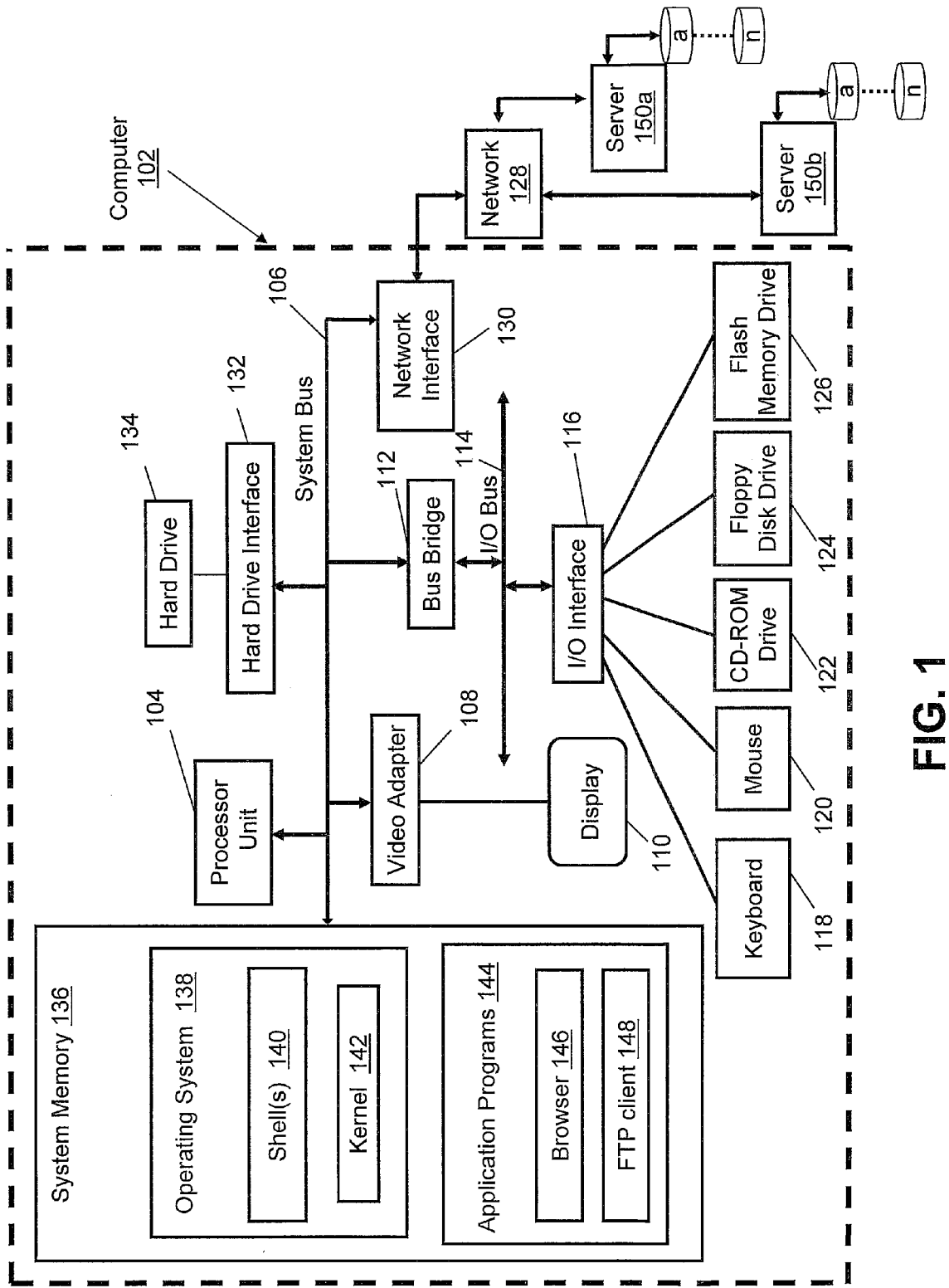
FIG. 1 depicts a high level block diagram of an exemplary data processing system, as utilized in an embodiment of the present invention.

With reference now to FIG. 1, there is depicted a block diagram of an exemplary computer 102 with which the present invention may be utilized. Computer 102 includes processor unit 104 that is coupled to system bus 106. Video adapter 108, which drives/supports display 110, is also coupled to system bus 106. System bus 106 is coupled via bus bridge 112 to Input/Output (I/O) bus 114. I/O interface 116 is coupled to I/O bus 114. I/O interface 116 affords communication with various I/O devices, including keyboard 118, mouse 120, Compact Disk—Read Only Memory (CD-ROM) drive 122, floppy disk drive 124, and flash drive memory 126. The format of the ports connected to I/O interface 116 may be any known to those skilled in the art of computer architecture, including but not limited to Universal Serial Bus (USB) ports.

Computer 102 is able to communicate with servers 150*a* and 150*b* via network 128 using network interface 130, which is coupled to system bus 106. Although FIG. 1 depicts servers 150*a* and 150*b*, the number of servers may be more or less than two. Servers 150*a* and 150*b* include a plurality of directories, each of which may contain data files (a through n). Although FIG. 1 depicts servers 150a and 150b as containing a plurality of data files (a through n), the number of data files is variable and n is provided solely for illustration. Network 128 may be an external network such as the Internet, or an internal network such as an Ethernet or a Virtual Private Network (VPN).

Hard drive interface 132 is also coupled to system bus 106. Hard drive interface 132 interfaces with hard drive 134. In a preferred embodiment, hard drive 134 populates system memory 136, which is also coupled to system bus 106. System memory is defined as a lowest level of volatile memory in computer 102. This volatile memory may further include additional higher levels of volatile memory (not shown), including, but not limited to, cache memory, registers, and buffers. Data that populates system memory 136 includes operating system (OS) 138 and application programs 144.

OS 138 includes shell 140, for providing transparent user access to resources such as application programs 144. Generally, shell 140 is a program that provides an interpreter and an interface between the user and the operating system. As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include browser 146 and FTP client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with servers 150a and 150b. FTP client 148 supports the transfer of files to and from computer 102 utilizing FTP.

The hardware elements depicted in computer 102 are not intended to be exhaustive, but rather are representative to highlight certain components that mat be utilized to practice the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
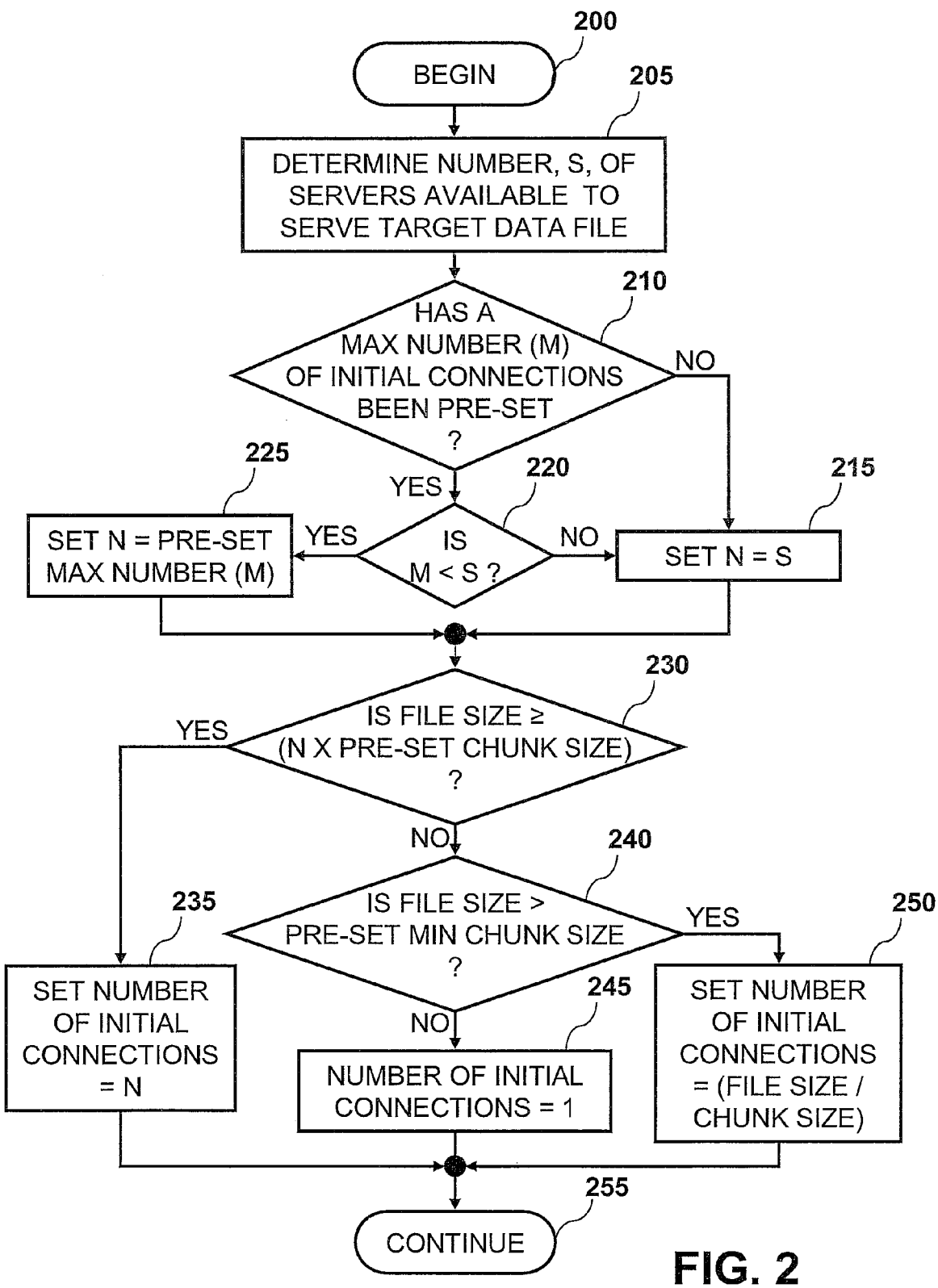
FIG. 2 is a high level logical flowchart of an exemplary method of determining an initial number of chunks into which a computer file is decomposed prior to a multi-source download in accordance with one embodiment of the invention.

Turning now to FIG. 2, there is depicted a high level logical flowchart of an exemplary method of determining an initial number of chunks for a multi-source file download in accordance with one embodiment of the invention. The depicts process begins at block 200, for example, in response to a user of computer 102 invoking browser 146 or FTP client 148, which preferably performs the remainder of the illustrated steps in an automated manner in order to facilitate a multi-source download of a data file from servers 150a and 150b over network 128. Hereafter, it will be presumed that browser 146 performs the remainder of the illustrated steps.

Following block 200, the process passes to block 205, which depicts browser 146 determining the number of available servers 150 connected to network 128 available to serve the target data file to be downloaded. When downloading a file, it is inefficient to decompose the file into a number of chunks that is greater than the number of servers 150 to which segments may be assigned. Similarly, if only one server 150 containing the file to be downloaded is available, decomposing the file into more than one chunk would cause redundant connections to be created with the same server 150. The present invention thus allows the user of computer 102 or a default setting of browser 146 to define a pre-set maximum number (M) of allowed initial connections and store M within system memory 136. In at least some embodiments of the present invention, browser 146 may dynamically determine M based on the attributes of the data file download. For example, browser 146 may have settings that govern the maximum number of allowed initial connections based upon the size and/or location of the servers in relation to the client, the communication bandwidth between the server(s) and the client, etc. For example, a policy of browser 146 might impose a limit of no more than 5 connections for a 100 MB file or might permit an unlimited number of connections with servers within the same subnet as the client.

A determination is next made at block 210 whether a value of M has been predetermined. As depicted at block 215, if a pre-set value of M has not been predetermined, a temporary variable (N) within system memory 136 is set to equal the number of available servers connected to network 128 that are available to serve the target data file. If a pre-set value of M has been determined (e.g., is stored within system memory 136 or dynamically determined from the attributes of the connection(s) of computer 102 to network 128), browser 146 determines at block 220 whether the pre-set value of M is less than the number of available servers 150 connected to network 128 that are available to serve the target data file. If not, then N is set equal to the number of available servers 150, as depicted at block 215. If the pre-set value of M is less than the number of servers 150 available to serve the target data file, then N is set equal to the pre-set value of M, as depicted at block 225.

To reduce data file download times, larger data files are typically decomposed into more chunks than smaller data files. At block 230, browser 146 determines whether the size of the target data file is greater than or equal to N multiplied by a pre-set chunk size, where the pre-set chunk size is either predefined by a user of computer 102 or by a default setting of browser 146. As will be appreciated by those skilled in the art, client computer 102 learns the size of the target data file in a response to its initial request to download a target data file from a central file manager. The manager returns the target data file's properties (e.g., size, name, md5 checksum, etc.) along with a list of servers from which client computer can access the file.

In an alternate embodiment of the present invention, browser 146 may dynamically determine the chunk size based on the attributes of the data file download, as described above. If the size of the target data file to be downloaded is greater than or equal to N multiplied by the pre-set chunk size, the preferred number of initial connections is set equal to N, as depicted at block 235. The process then continues at block 255, which represents browser 146 performing a conventional multi-source data file download utilizing the determined number of initial connections.

If the size of the file to be downloaded is not greater than or equal to N multiplied by the pre-set chunk size, browser 146 determines at block 240 whether the size of the target data file is greater than a pre-set minimum chunk size, where the pre-set minimum chunk size is defined by a user of computer 102 or by a default setting of browser 146. In an alternate embodiment of the present invention, browser 146 may dynamically determine the minimum chunk size based on the attributes of the connection(s) of computer 102 to network 128 when a data file download is initiated. Factors that may be included in this determination can include, for example, the maximum bandwidth client computer 102 is allowed and the location of client computer 102 in relation to the server(s). For example, a client computer 102 behind a high speed link might have a larger minimum chunk size than a client computer 102 behind a slow speed link. If the size of the target data file is not greater than the pre-set minimum chunk size, the preferred number of initial connections is set equal to one, as depicted at block 245. The process then passes to block 255, which has been described.

If browser 146 determines at block 240 that the size of the target data file is greater than the pre-set minimum chunk size, browser 146 sets the preferred number of initial connections equal to integer resulting from dividing the size of the target data file by the pre-set (i.e., not minimum) chunk size, as depicted at block 250. The process then proceeds to block 255, which has been described.

As has been described, the present invention provides a method, system, and program product for determining a number of initial connections for a multi-source file download. In one embodiment, the method includes utilizing a network connection to determine the number of servers that are available to serve a target data file to be downloaded and determining a maximum number of initial connections. In one embodiment, the maximum number of initial connections is equal to the smaller value of either a pre-set maximum number of connections or the number of servers available to serve the target data file. The size of the target data file is compared to the product of the maximum number of connections and a pre-set chunk size. A preferred number of initial connections is then determined based on the maximum number of initial connections, the size of the file to be downloaded, the pre-set chunk size, and a pre-set minimum chunk size.

While the invention has been particularly shown and described with reference to a preferred embodiment, it will be understood by those skilled in the art that various changes in form and detail may be made therein without departing from the spirit and scope of the invention. It is understood that the use herein of specific names are for example only and not meant to imply any limitations on the invention. Moreover, while an illustrative embodiment of the present invention has been described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of computer readable media used to actually carry out the distribution. Examples of computer readable media include recordable type media such as thumb drives, floppy disks, hard drives, CD ROMs, DVDs, and transmission type media such as digital and analog communication links.

What is claimed is:

1. A method in data processing system of determining a number of connections to initially utilize for a download of a target data file from a set of plurality of servers, said method comprising:
   determining a maximum number of initial connections based at least in part upon a number of servers available to serve a target data file to be downloaded;
   determining a size of the target data file; and
   determining the number of initial connections to utilize for a download of the target data file based at least in part upon the maximum number of initial connections, the size of the target data file, and a chunk size of one or more chunks into which the target data file is to be decomposed.

2. The method of claim 1, wherein said determining a maximum number of initial connections comprises determining the maximum number of initial connections as a smaller of a pre-set maximum number of initial connections and the number of servers available to serve the target data file.

3. The method of claim 1, wherein determining the number of initial connections comprises:
   determining if the size of the target data file is at least as large as the maximum number of initial connections multiplied by the chunk size; and
   in response to determining that the size of the target data file is at least as large as the maximum number of initial connections multiplied by the chunk size, setting the number of initial connections to the maximum number of initial connections.

4. The method of claim 3, and further comprising:
   in response to determining that the size of the target data file is not as large as the maximum number of initial connections multiplied by the chunk size, setting the number of initial connections to an integer obtained by dividing the size of the target data file by the chunk size.

5. The method of claim 1, and further comprising: performing a multi-source download of the target data file from a set of plurality of servers utilizing the determined number of initial connections.

6. A data processing system, comprising:
   a processor unit;
   a network interface;
   data storage including program code that, when processed by the processor unit, causes the data processing system to perform a method of determining a number of connections to initially utilize for a download of a target data file from a set of plurality of servers via the network interface, said method including:
   determining a maximum number of initial connections based at least in part upon a number of servers available to serve a target data file to be downloaded;
   determining a size of the target data file; and
   determining the number of initial connections to utilize for a download of the target data file based at least in part upon the maximum number of initial connections, the size of the target data file, and a chunk size of one or more chunks into which the target data file is to be decomposed.

7. The data processing system of claim 6, wherein said determining a maximum number of initial connections comprises determining the maximum number of initial connections as a smaller of a pre-set maximum number of initial connections and the number of servers available to serve the target data file.

8. The data processing system of claim 6, wherein determining the number of initial connections comprises:
   determining if the size of the target data file is at least as large as the maximum number of initial connections multiplied by the chunk size; and
   in response to determining that the size of the target data file is at least as large as the maximum number of initial connections multiplied by the chunk size, setting the number of initial connections to the maximum number of initial connections.

9. The data processing system of claim 8, wherein the method further comprises:
   in response to determining that the size of the target data file is not as large as the maximum number of initial connections multiplied by the chunk size, setting the number of initial connections to an integer obtained by dividing the size of the target data file by the chunk size.

10. The data processing system of claim 6, wherein the method further comprises: performing a multi-source download of the target data file from a set of plurality of servers utilizing the determined number of initial connections via the network interface.

11. A program product, comprising:

a computer storage medium; and the computer storage medium encoded program code that causes a data processing system to perform a method of determining a number of connections to initially utilize for a download of a target data file from a set of plurality of servers via the network interface, said method including:

determining a maximum number of initial connections based at least in part upon a number of servers available to serve a target data file to be downloaded;

determining a size of the target data file; and determining the number of initial connections to utilize for a download of the target data file based at least in part upon the maximum number of initial connections, the size of the target data file, and a chunk size of one or more chunks into which the target data file is to be decomposed.

12. The program product of claim 11, wherein said determining a maximum number of initial connections comprises determining the maximum number of initial connections as a smaller of a pre-set maximum number of initial connections and the number of servers available to serve the target data file.

13. The program product of claim 11, wherein determining the number of initial connections comprises:

determining if the size of the target data file is at least as large as the maximum number of initial connections multiplied by the chunk size; and in response to determining that the size of the target data file is at least as large as the maximum number of initial connections multiplied by the chunk size, setting the number of initial connections to the maximum number of initial connections.

14. The program product of claim 13, wherein the method further comprises:

in response to determining that the size of the target data file is not as large as the maximum number of initial connections multiplied by the chunk size, setting the number of initial connections to an integer obtained by dividing the size of the target data file by the chunk size.

15. The program product of claim 11, wherein the method further comprises: performing a multi-source download of the target data file from a set of plurality of servers utilizing the determined number of initial connections via the network interface.

* * * * *